United States Patent Office 3,270,082
Patented August 30, 1966

3,270,082
PRODUCTION OF HIGH PURITY ISOPRENE
Daniel Lumbroso, Le Vesinet, Fernand Coussemant, Paris, and Michel Hellin, Rueil-Malmaison, France, assignors to Institut Français du Petrole, des Carburants et Lubrifiants, Rueil-Malmaison, France
No Drawing. Filed May 11, 1965, Ser. No. 455,000
Claims priority, application France, May 12, 1964, 974,247
26 Claims. (Cl. 260—681)

This invention relates to a process for the production of isoprene, and in particular to a process which is capable of yielding isoprene in a purified form, more particularly to a process which yields isoprene having a low content of cyclopentadiene.

A very worthwhile process for the production of isoprene comprises the reaction of an aqueous formaldehyde solution with raw isobutene in the presence of an acid catalyst. This process is particularly economical due to, in part, its technological flexibility wherein it can utilize raw $C_4$ olefinic mixtures containing isobutene, it being of no substantial consequence whether or not the other olefins are mono-olefins or diolefins. Such mixtures can be obtained at a relatively low cost from petrochemical operations, e.g., the $C_4$ olefin cut.

There is obtained by the above process 4,4-dimethyl-1,3-dioxane having small quantities of other 1,3-dioxanes which are for all practical purposes not separable by distillation from the 4,4-dimethyl-dioxane. These other 1,3-dioxanes are produced by unwanted side reactions between formaldehyde and other mono- or diolefins containing four carbon atoms per molecule which are present in the $C_4$ cut.

To exemplify the impurities present in a crude 4,4-dimethyl-1,3-dioxane as obtained by said process, the distillation curve of the crude has an initial distillation point of about 75–130° C. and a final distillation point of about 135–150° C. This distillation range can be narrowed by more rigorous distillation procedures, including, for example, the utilization of one or more columns having a large number of distillation trays, and/or the employment of high reflux ratios. These latter conventional distillation techniques, though all adding substantially to the cost of the dimethyldioxane obtained thereby, do not succeed in eliminating the unwanted impurities to the extent desired. Thus, the purification of the dimethyldioxane by distillation does not constitute a satisfactory industrial procedure.

After the crude dimethyldioxane is obtained, it is then catalytically cracked to yield isoprene. This reaction is conducted generally at a temperature of about 200–500° C. in the presence of a catalyst conventionally employed for this reaction, such catalysts being generally selected from the group of dehydrating catalysts, acid catalysts, or catalysts which yield an acid reaction. Examples of these catalysts include phosphoric acids and the corresponding phosphates thereof, in particular boron phosphate, conventional cracking catalysts, such as silica-alumina, and analogous products thereof, employed either as such or in admixture and optionally supported on a catalyst carrier. Processes of this type are described, for example, in French Patents No. 1,239,215 of March 22, 1957 and No. 1,294,712 of September 29, 1958, as well as the Addition Patent No. 75,215/1,249,215 of July 30, 1958. Such a process is evidently very economical from the fact that it can utilize low-cost hydrocarbon cuts directly, for example, those cuts obtained from such operations as steam cracking, thermal cracking catalytic cracking, reforming, or dehydrogenation of mixtures of hydrocarbons, instead of utilizing pure isobutene.

In connection with such processes based on 4,4-dimethyl-1,3-dioxane, the following considerations are important:

(1) Isoprene obtained by such a process contains by-products which, for all practical purposes, are inseparable by distillation and which by-products, although being present in very slight proportions, can nevertheless interfere with the stereospecific polymerization of isoprene. Among these by-products, one of the most well known is cyclopentadiene.

(2) The presence of cyclopentadiene appears to be linked, at least in part, to the presence of butadiene in the $C_4$ cut. However, the total elimination of butadiene from this $C_4$ cut is very difficult and costly.

A principal object of this invention, therefore, is to provide an improved process for the production of isoprene, in particular wherein the isoprene is produced from a crude 4,4-dimethyl-1,3-dioxane as obtained by a reaction of formaldehyde with a $C_4$ cut containing isobutene.

Another object is to provide a process for the production of isoprene wherein the final product contains a sufficiently low content of by-products, so that the isoprene can be polymerized into stereospecific polymers without any difficulty.

Upon further study of the specification and claims, other objects and advantages of the present invention will become apparent.

To attain the objects of this invention, a process is provided wherein the crude 4,4-dimethyl-1,3-dioxane is subjected to hydrogenation before it is catalytically cracked to produce the isoprene. By the utilization of this intermediate step, the impurities which accompany the dioxane are either lowered in quantity and/or their chemical structure is changed in such a manner that the isoprene resulting from the next step of catalytic cracking contains only a very slight proportion of by-products which do not interfere with the subsequent polymerization step. In particular, the quantity of cyclopentadiene is considerably lowered in relationship to its level without the intermediate hydrogenation treatment.

The excellent results which are obtained by this invention are still not explainable in a satisfactory manner. Investigation in depth revealed that cyclopentadiene can be formed from the catalytic decomposition of 4-vinyl-1,3-dioxane, the latter compound being produceable by the reaction of formaldehyde with butadiene. This explanation, however, is not complete inasmuch as a satisfactory reduction in the contents of cyclopentadiene in the isoprene product is not obtained when the consumption of hydrogen in the hydrogenation reaction is only stoichiometric in relation to the 4-vinyl-1,3-dioxane contained in the isoprene. It is only when at least a 50% excess consumption of hydrogen for the reaction of 4-vinyl-1,3-dioxane to the corresponding 4-ethyl-1,3-dioxane is employed, that a satisfactory diminution in the cyclopentadiene content can be obtained in a single treatment. In general, a consumption of hydrogen of 1.5 to 20 times the stoichiometric quantity for the latter reaction is required. Preferably, a quantity of 3.5 to 6 times is employed. (The theoretical consumption for the reaction of the 4-vinyl to the 4-ethyl compound is 1 mol of hydrogen per 1 mol of the vinyl dioxane.)

The proportion of vinyl dioxane in the crude 4,4-dimethyl-1,3-dioxane varies considerably, but generally is about 100–20,000 p.p.m. (weight basis, based on the total crude dioxane).

The hydrogenation treatment can be conducted by the utilization of conventional hydrogenation catalysts, in particular those catalysts based on metals of Groups IB and VIII of Mendeleev's Periodic Table, these catalysts being also effective when applied to catalyst supports. Examples of such catalysts are platinum, rhodium, palladium, and nickel. It is here to be mentioned, though, that there is a much preferred catalyst among this group, inasmuch as it has been discovered that Raney nickel (porous nickel) is considerably more resistant to poisoning than other catalysts. This poisoning is particularly due to the reaction of formaldehyde which may exist in a small quantity in the raw or partially purified 4,4-dimethyl-1,3-dioxane. As a matter of fact, in the presence of formaldehyde in a proportion of at least 10 millimols per liter, the other catalysts lose the major part of their activity. These other catalysts, then, should be used only for the catalytic hydrogenation of dimethyldioxane which contains less than 10, preferably less than 1, millimol per liter of formaldehyde.

With respect to the reaction conditions employed for this hydrogenation step, conditions can be employed which are suitable for analogous hydrogenation reactions.

In general, it is desirable that the flow rate for dimethyldioxane be kept at less than 30 grams of dimethyl dioxane per gram of catalyst per hour, preferably 1–15 grams of dimethyl dioxane per gram of catalyst per hour.

The hydrogenation temperature should generally be lower than 200° C., preferably between 0 and 100° C. The pressure can be either subatmospheric, atmospheric, or superatmospheric.

The hydrogenation is generally continued until the rate of hydrogen absorption tails off, corresponding to about 1.5 to 20 (more often 1.5 to 10) times the theoretical consumption. Such a result is usually obtained in less than a minute, but it is not disadvantageous to maintain a contact between the reactants and catalyst for a little bit longer. Of further advantage is that it is not necessary to wait for the complete cessation of hydrogen absorption, which cessation is generally not obtained until after a few minutes or, in many cases, after tens of minutes.

From the preceding description of the hydrogenation reaction, it is apparent that it is a rapid reaction. Moreover, there is only a slight consumption of hydrogen. Of even more importance is that there is not observed occurrence of known secondary reactions; in particular, at the relatively low temperatures suggested, the meta-dioxane nucleus is not affected.

This process is particularly applicable to dioxanes obtained from mixtures of hydrocarbons of which at least 80% by weight of the constituents are hydrocarbons containing four carbon atoms per molecule and which contain at least 20% by weight of isobutene and less than 10%, for example 0.1–5% by weight of butadiene.

When the crude 4,4-dimethyl-1,3-dioxane contains enough formaldehyde, it is advantageous to eliminate at least a part of the latter before proceeding with the hydrogenation. Among the numerous useful methods are, for example, percolation through activated carbon, extraction with water, treatment with sodium sulfite, treatment with particulate sodium hydroxide, and passage over ion exchange resins. It is preferred, however, to employ an extractive distillation, using water as the entraining agent. In practice, it is sufficient to distil less than 40% (in the neighborhood of 1–20%) of the total volume of the dimethyldioxane in the presence of 1–50% by volume of water. By this simple method, the content in formaldehyde is decreased to a particularly low level. The distillation products are not lost and can be reintroduced, for example, in the conversion zone for the decomposition of dimethyl dioxane to isoprene.

Without further elaboration, it is believed that one skilled in the art can, using the preceding description, utilize the present invention to its fullest extent. The following preferred specific embodiments are, therefore, to be construed as merely illustrative and not limitative of the remainder of the specification and claims in any way whatsoever.

*Example 1*

There is utilized as the starting material an olefinic $C_4$ cut derived from a "steam cracking" step. This cut has the following molar composition:

| | Percent (in mols) |
|---|---|
| Isobutane | 1.90 |
| n-Butane | 4.85 |
| Butene-1 | 27.30 |
| Isobutene | 45.15 |
| Transbutene-2 | 11.05 |
| Cisbutene-2 | 8.25 |
| Butadiene | 1.50 |

Six liters of this olefinic $C_4$ cut is then treated in a counter-current manner with 6 liters of an aqueous solution containing 50% by weight of formaldehyde and 10% by weight of sulfuric acid at a temperature of 70° C. until 89% of the isobutene contained in this cut is converted. There is recovered, by rapid distillation of the neutral organic phase, the 4,4-dimethyl-1,3-dioxane in crude form (boiling point range 80–140° C./760 mm. Hg) with a molar yield of 80% relative to the isobutene converted.

By chromatographic analysis of the resultant 4,4-dimethyl-1,3-dioxane, there is detected the following number of dioxanes as by-products:

| | Percent (in mols) |
|---|---|
| 4,5-trans-dimethyl-1,3-dioxane | 0.9 |
| 4,5-cis-dimethyl-1,3-dioxane | 1.2 |
| 4-ethyl-1,3-dioxane | 0.14 |
| 4-vinyl-1,3-dioxane | 0.1 |

1160 g. of the raw 4,4-dimethyl-1,3-dioxane is treated with hydrogen in the presence of 10 g. of a 5% platinum-on-carbon catalyst at a temperature of 20° C. During about 20 seconds, 960 cc. of hydrogen are absorbed, and then the rate of hydrogen absorption falls off substantially (this quantity of hydrogen is about four times higher than that necessary for the hydrogenation of the existent 4-vinyl-1,3-dioxane).

Next, there is passed over a phosphoric acid catalyst supported by quartz ($H_3PO_4$=3% by weight of catalyst) at a temperature of 270° C. equal volumes of water vapor, on the one hand, and crude 4,4-dimethyl-1,3-dioxane, on the other hand. For a conversion of 90% of the raw dioxane, there is obtained a molar yield of 80% in relationship to the 4,4-dimethyl-1,3-dioxane, of an isoprene product containing 35 p.p.m. by weight of cyclopentadiene.

For purposes of comparison, if the intermediate hydrogenation treatment is eliminated, all other things being equal, there is recovered an isoprene product containing 290 p.p.m. by weight of cyclopentadiene.

*Example 2*

Example 1 is repeated but the hydrogenation treatment is conducted until an absorption of 980 cc. of hydrogen in 40 seconds.

The isoprene finally obtained contains only 25 p.p.m. by weight of cyclopentadiene. The yield of isoprene and the conversion of dioxane are not modified.

This example shows that an extended duration of the hydrogenation treatment results in a corresponding reduction in the cyclopentadiene content. By prolonging the duration of the hydrogenation even further, even better results can be obtained.

*Example 3*

Example 1 is repeated, but the conversion of isobutene during the first step of the process is lowered to 69%, and the distillation of the 4,4-dimethyl-1,3,-dioxane is limited to a cut having a boiling point range of 132–134° C. (760 mm. Hg).

There is then obtained, at a molar yield of 81% by weight of the converted isobutene, a crude 4,4-dimethyl-1,3-dioxane containing the following dioxane impurities:

|  | Percent (in mols) |
|---|---|
| 4,5-trans-dimethyl-1,3-dioxane | 0.42 |
| 4,5-cis-dimethyl-1,3-dioxane | 0.55 |
| 4-ethyl-1,3-dioxane | 0.06 |
| 4-vinyl-1,3-dioxane | 0.05 |

Next, the crude dioxane mixture is hydrogenated in the presence of 6 g. of a 5% platinum-on-carbon catalyst. In 30 seconds, 450 cc. of hydrogen are absorbed, and then the rate of absorption becomes very slow.

After the hydrogenation treatment, the dimethyldioxane is then subjected to catalytic cracking. The recovered isoprene contains only 15 p.p.m. of cyclopentadiene, and the molar yield and conversion are not modified.

For purposes of comparison, if the hydrogenation treatment is eliminated, all other things being equal, there is recovered an isoprene containing 140 p.p.m. by weight of cyclopentadiene. This comparison is particularly significant since the crude dimethyldioxane was distilled to a narrow boiling point of 132–134° C.; however, even with such a fine distillation, the contents of cyclopentadiene in the final isoprene product is not diminished nearly enough to meet industrial requirements for the stereospecific polymerization of the product.

*Example 4*

In a hydrogenation apparatus, there is introduced Raney nickel, as well as 110 cc. of 4,4-dimethyl-1,3-dioxane in crude form, containing 510 p.p.m. of 4-vinyl-1,3-dioxane and 6.4 millimols per liter of formaldehyde. The flow rate of the crude dioxane is 42 g./h., and the hydrogen is admitted in a large excess, the reaction volume being maintained constant at 120 cc.

The liquid effluent is decanted, the catalyst recycled to the hydrogenation reaction, and the liquid phase analyzed. There is obtained by this continuous process at a temperature of 22° C. the following result (the lower limit of analysis is 20 p.p.m. of vinyl dioxane):

| Quantity of Raney nickel (g.): | Content in 4-vinyl-1,3-dioxane (p.p.m.) |
|---|---|
| 0 | 510 |
| 0.5 | 405 |
| 1 | 320 |
| 2 | 125 |
| 3 | 55 |
| 4 | <20 |

*Example 5*

The following comparative experiments are conducted, in each case with 2 g. of catalyst and 100 g. of 4,4-dimethyl-1,3-dioxane containing as the only impurities 4-vinyl-1,3-dioxane and formaldehyde. The hydrogenation is continued until the complete cessation of hydrogen absorption. The following results are obtained:

The preceding examples can be repeated with similar success by substituting the generically and specifically described reactants and operating conditions of this invention for those used in the preceding examples.

From the foregoing description, one skilled in the art can easily ascertain the essential characteristics of this invention, and without departing from the spirit and scope thereof, can make various changes and modifications of the invention in order to adapt it to various usages and conditions. Consequently, such changes and modifications are properly, equitably, and intended to be, within the full range of equivalence of the following claims.

What is claimed is:

1. In a process for the production of isoprene by the steps of reacting an isobutene-containing olefinic $C_4$ cut with formaldehyde to produce crude 4,4-dimethyl-1,3-dioxane, and then catalytically cracking the resultant dioxane to obtain isoprene, the improvement which comprises the intermediate step of hydrogenating the crude 4,4-dimethyl-1,3-dioxane before it is subjected to the catalytic cracking step.

2. A process as defined by claim 1 wherein the hydrogenation step is conducted in the presence of a hydrogenation catalyst.

3. A process as defined by claim 2 wherein the hydrogenation process is conducted until there is an excess quantity of hydrogen absorbed relative to the quantity required for a reaction between said hydrogen and any 4-vinyl-1,3-dioxane present in the crude 4,4-dimethyl-1,3-dioxane.

4. A process as defined by claim 2 wherein the hydrogenation treatment is continued until a quantity of hydrogen is absorbed which is equivalent to 1.5–20 mols per mol of 4-vinyl-1,3-dioxane present in the crude 4,4-dimethyl-1,3-dioxane.

5. A process as defined by claim 2 wherein the hydrogenation catalyst is selected from the group consisting of nickel, rhodium, platinum, and palladium.

6. A process as defined by claim 4 wherein the hydrogenation catalyst is selected from the group consisting of nickel, rhodium, platinum, and palladium.

7. A process as defined by claim 2 wherein the crude 4,4-dimethyl-1,3-dioxane contains formaldehyde and the hydrogenation catalyst is Raney nickel.

8. A process as defined by claim 4 wherein the crude 4,4-dimethyl-1,3-dioxane contains formaldehyde and the hydrogenation catalyst is Raney nickel.

9. A process as defined by claim 2 wherein the flow rate of crude 4,4-dimethyl-1,3-dioxane is lower than 30 g. per gram of catalyst per hour.

10. A process as defined by claim 4 wherein the flow rate of crude 4,4-dimethyl-1,3-dioxane is lower than 30 g. per gram of catalyst per hour.

11. A process as defined by claim 8 wherein the flow rate of crude 4,4-dimethyl-1,3-dioxane is lower than 30 g. per gram of catalyst per hour.

12. A process as defined by claim 2 wherein the flow rate of the crude 4,4-dimethyl-1,3-dioxane is between 1 and 15 g. per gram of catalyst per hour.

13. A process as defined by claim 4 wherein the flow rate of the crude 4,4-dimethyl-1,3-dioxane is between 1 and 15 g. per gram of catalyst per hour.

| Absorption Time (minutes) | Catalyst | Concentration of Formaldehyde, millimols/liter | Content in Vinyl Dioxane (p.p.m.) | |
|---|---|---|---|---|
| | | | Initial | Final |
| 25 | 5% platinum-on-carbon | <1 | 11,300 | <20 |
| 3 | do | 60 | 350 | 190 |
| 15 | 5% rhodium-on-carbon | 64 | 350 | <20 |
| 200 | 30% nickel-on-kieselguhr | 64 | 350 | 130 |
| 170 | Raney nickel | 64 | 350 | <20 |
| 290 | do | 100 | 2,000 | <20 |
| 105 | Raney nickel containing 2% by weight of palladium | 54 | 6,000 | <20 |

14. A process as defined by claim 8 wherein the flow rate of the crude 4,4-dimethyl-1,3-dioxane is between 1 and 15 g. per gram of catalyst per hour.

15. A process as defined by claim 2 wherein the hydrogenation temperature is lower than 200° C.

16. A process as defined by claim 2 wherein the hydrogenation temperature is about 0–100° C.

17. A process as defined by claim 4 wherein the hydrogenation temperature is about 0–100° C.

18. A process as defined by claim 8 wherein the hydrogenation temperature is about 0–100° C.

19. A process as defined by claim 14 wherein the hydrogenation temperature is about 0–100° C.

20. A process as defined by claim 2 wherein the crude 4,4-dimethyl-1,3-dioxane contains about 100–20,000 p.p.m. of 4-vinyl-1,3-dioxane.

21. A process as defined by claim 4 wherein the crude 4,4-dimethyl-1,3-dioxane contains about 100–20,000 p.p.m. of 4-vinyl-1,3-dioxane.

22. A process as defined by claim 8 wherein the crude 4,4-dimethyl-1,3-dioxane contains about 100–20,000 p.p.m. of 4-vinyl-1,3-dioxane.

23. A process as defined by claim 16 wherein the crude 4,4-dimethyl-1,3-dioxane contains about 100–20,000 p.p.m. of 4-vinyl-1,3-dioxane.

24. A process as defined by claim 19 wherein the crude 4,4-dimethyl-1,3-dioxane contains about 100–20,000 p.p.m. of 4-vinyl-1,3-dioxane.

25. A process as defined by claim 2 wherein the crude 4,4-dimethyl-1,3-dioxane contains formaldehyde, and wherein the process comprises a further step of separating at least a portion of this formaldehyde before the hydrogenation treatment.

26. A process as defined by claim 25 wherein the separation of the formaldehyde is conducted by extractive distillation with water.

References Cited by the Examiner

UNITED STATES PATENTS

| | | | |
|---|---|---|---|
| 3,057,923 | 10/1962 | Hellin et al. | 260—681 |
| 3,142,712 | 7/1964 | Valet et al. | 260—681 |

DELBERT E. GANTZ, *Primary Examiner.*

G. E. SCHMITKONS, *Assistant Examiner.*